United States Patent
Link, II

(10) Patent No.: US 12,307,874 B2
(45) Date of Patent: May 20, 2025

(54) DETERMINING THE STATUS OF A TRACKING DEVICE BASED ON ORIENTATION

(71) Applicant: M2MD Technologies, Inc., Atlanta, GA (US)

(72) Inventor: Charles M. Link, II, Atlanta, GA (US)

(73) Assignee: M2MD Technology, Inc., Atlanta, GA (US)

( * ) Notice: Subject to any disclaimer, the term of this patent is extended or adjusted under 35 U.S.C. 154(b) by 247 days.

(21) Appl. No.: 17/942,302

(22) Filed: Sep. 12, 2022

(65) Prior Publication Data

US 2023/0078591 A1 Mar. 16, 2023

Related U.S. Application Data

(60) Provisional application No. 63/243,687, filed on Sep. 13, 2021.

(51) Int. Cl.
*G08B 21/18* (2006.01)
*H04W 64/00* (2009.01)

(52) U.S. Cl.
CPC .......... *G08B 21/18* (2013.01); *H04W 64/003* (2013.01)

(58) Field of Classification Search
CPC .. G08B 21/18; G08B 13/2402; H04W 64/003
See application file for complete search history.

(56) References Cited

U.S. PATENT DOCUMENTS

| 2005/0210418 | A1* | 9/2005 | Marvit | G06F 3/017 715/863 |
| 2011/0063138 | A1* | 3/2011 | Berkobin | G08G 1/207 340/988 |
| 2016/0292885 | A1* | 10/2016 | Greenspan | G06T 7/68 |

* cited by examiner

*Primary Examiner* — Rufus C Point
(74) *Attorney, Agent, or Firm* — John L. Doughty; Doughty Law, L, L, C,

(57) ABSTRACT

A battery-powered tracking device may comprise a processor and orientation sensors that generate orientation signals and provide them to a processor. The processor may use the orientation signals, or orientation values corresponding thereto, to determine whether or not the tracking device has moved during a configured no-change period relative to a baseline orientation that was determined before the no-change period. The no-change period may be selected to correspond to an amount of time during which the tracking device, or an item with which it is associated, such as a vehicle, tool, or shipping package, is not expected to move. If a determination is made during the no-change period that the tracking device has changed orientation, an alert may be sent to a tracking application to notify a user of the application that the tracking device may have been removed from the item with which is it associated.

20 Claims, 12 Drawing Sheets

DETERMINING THE STATUS OF A TRACKING DEVICE BASED ON ORIENTATION

CROSS REFERENCE TO RELATED APPLICATION

This application claims priority under 35 U.S.C. 119(e) to U.S. provisional patent application No. 63/243,687 "Method and system for determining the status of a tracking device based on orientation," which was filed Sep. 13, 2021, and which is incorporated herein by reference in its entirety.

FIELD

The present invention relates to tracking devices, and more particularly to determining the usage status of a tracking device based on an orientation of the tracking device.

BACKGROUND

Wireless communications devices serve many purposes in today's connected world. In addition to providing communication between people using such devices, wireless communications devices may use sensors to provide information regarding the environment surrounding the device to a user. Such information may be provided wirelessly to another wireless communication devices, such as a user equipment device ("UE"). Examples of user equipment devices include smart phones, tablets, smart watches, machine-to-machine devices, internet-of-things devices, and the like. Information that may be provided to a UE includes the location of the device that is providing the information.

A UE may use myriad means and methods for determining its location, such as GPS and triangulation between cellular towers or triangulation between Wi-Fi hot spots. Typically, a tracking device periodically transmits a location message. A location message may be referred to as a tracking message. A tracking message may include identification information that uniquely identifies the tracking device, either uniquely with respect to all other tracking devices (i.e., and IMSI or MAC identifier), or the information may uniquely identify the tracking device among one or more tracking devices that are monitored by an individual or an entity that tracks many items to which tracking devices are affixed. A tracking message may be encrypted so that only a device that receives the tracking message either directly, or indirectly from an intermediate device such as a tracking device management server coupled to a communication network, can decrypt the tracking message to obtain the location of the tracking device(s) and thus the location(s) of item(s) or person(s) to which the device(s) is/are affixed and correspond to.

One use for tracking devices is to track the whereabouts of vehicles, or the whereabouts of individuals. Individuals who drive vehicles being tracked (such as a driver that drives commercial vehicles, or fleet vehicles), or who themselves are being tracked, for example by a law enforcement agency tracking someone released on bail or a convict on probation, often desire not to be tracked. Thus, an individual may remove a tracking device from a vehicle they are assigned to drive or from themself while conducting activity away from a location where they may leave the tracking device.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

In an example embodiment a tracking device comprises at least one orientation sensor and a processor that is configured to: receive at least one baseline orientation signal from the at least one orientation sensor, wherein the at least one baseline orientation signal was generated at a baseline time and with the tracking device being in a baseline orientation, determine at least one baseline orientation value corresponding to the at least one baseline orientation signal; receive at least one current orientation signal from the at least one orientation sensor, wherein the at least one current orientation signal was generated during a configured no-change period after the baseline time and with the tracking device being in a current orientation, determine at least one new orientation value corresponding to the at least one current orientation signal; analyze the at least one new orientation value and the at least one baseline orientation value to result in an orientation change; analyze the orientation change with respect to an orientation change criterion to result in an orientation change determination; and based on the orientation change determination, send an alert message to a tracking device application indicating the orientation change determination.

In an embodiment the at least one baseline orientation value may comprise a baseline vector corresponding to the baseline orientation of the tracking device in a coordinate system and the new orientation value comprises a new vector corresponding to the current orientation in the coordinate system. The baseline values or the new values may comprise values that may be used to generate, or that may represent, vectors in a coordinate space, such as a three-dimensional, three-axes coordinate system.

In an embodiment, the analyzing of the orientation change with respect to an orientation change criterion to result in an orientation change determination may be made, or determined, when the at least one new orientation value differs by more than a predetermined tolerance of the at least one baseline orientation value. For example, if an angle of a new orientation vector that was determined from signals generated by an orientation sensor, or sensors, and provided to the processor during the no-change period, deviates from a baseline orientation vector angle by more than, for example, one degree, the processor may determine that the tracking device moved during the no-change period, but if the angles deviate by less than one degree, the processor may determine that the tracking device did not move during the no-change period. In the example just described, the one-degree tolerance may be derived from, based on, or configured to correspond to, variations that may naturally occur to components of the tracking device due to, for example, heat, humidity, magnetic field, noise, or other phenomena that may cause electronic sensors and circuits to not provide exactly repeatable results from one measurement occurrence to another.

In an embodiment, the tracking device may further comprise an orientation module that comprises the at least one orientation sensor. The orientation module may be a micro electro-mechanical systems ("MEMS") device that comprises at least one accelerometer. The orientation module may be an inertial measurement unit ("IMU") that comprises at least one accelerometer, gyroscope, or magnetometer.

In an embodiment the at least one new orientation value that may correspond to the at least one current orientation signal received from the at least one orientation sensor may be received at the end of the predetermined no-change period.

In an embodiment, the tracking device may further comprise a global positioning satellite module ("GPS") module, wherein GPS coordinate information is not used to determine whether the tracking device has or has not changed orientation relative to the baseline orientation during the no-change period.

In an embodiment, the tracking device may further comprise a wireless communication modem module to facilitate communication with a wireless mobile communication network, wherein wireless mobile communication network information received from the wireless mobile communication network is not used to determine whether the tracking device has or has not changed orientation relative to the baseline orientation during the no-change period.

In an embodiment, the tracking device may further comprise: a GPS module, wherein GPS coordinate information is not used to determine whether the tracking device has or has not changed orientation relative to the baseline orientation during the no-change period; and a wireless communication modem module to facilitate communication with a wireless mobile communication network, wherein wireless mobile communication network information received from the wireless mobile communication network is not used to determine whether the tracking device has or has not changed orientation relative to the baseline orientation during the no-change period.

An advantage of not using GPS or not using wireless mobile communication network information received from the wireless mobile communication network is that circuitry of a GPS module or circuitry of a wireless communication modem (e.g., a modem or module that facilitates a device, such as a user equipment or a machine-to-machine device, communicating via a radio access network of a wireless mobile network such as a 4G or 5G network) is that a MEMS or an IMU may generate the orientation signals from the orientation signals without consuming much, if any power, whereas a GPS module or a wireless communication modem typically require power and processing resources, for example, which would typically cause unsatisfactory drawing of power, or charge, from a battery that powers the tracking device.

DETAILED DESCRIPTION OF THE DRAWINGS

Figure 1:
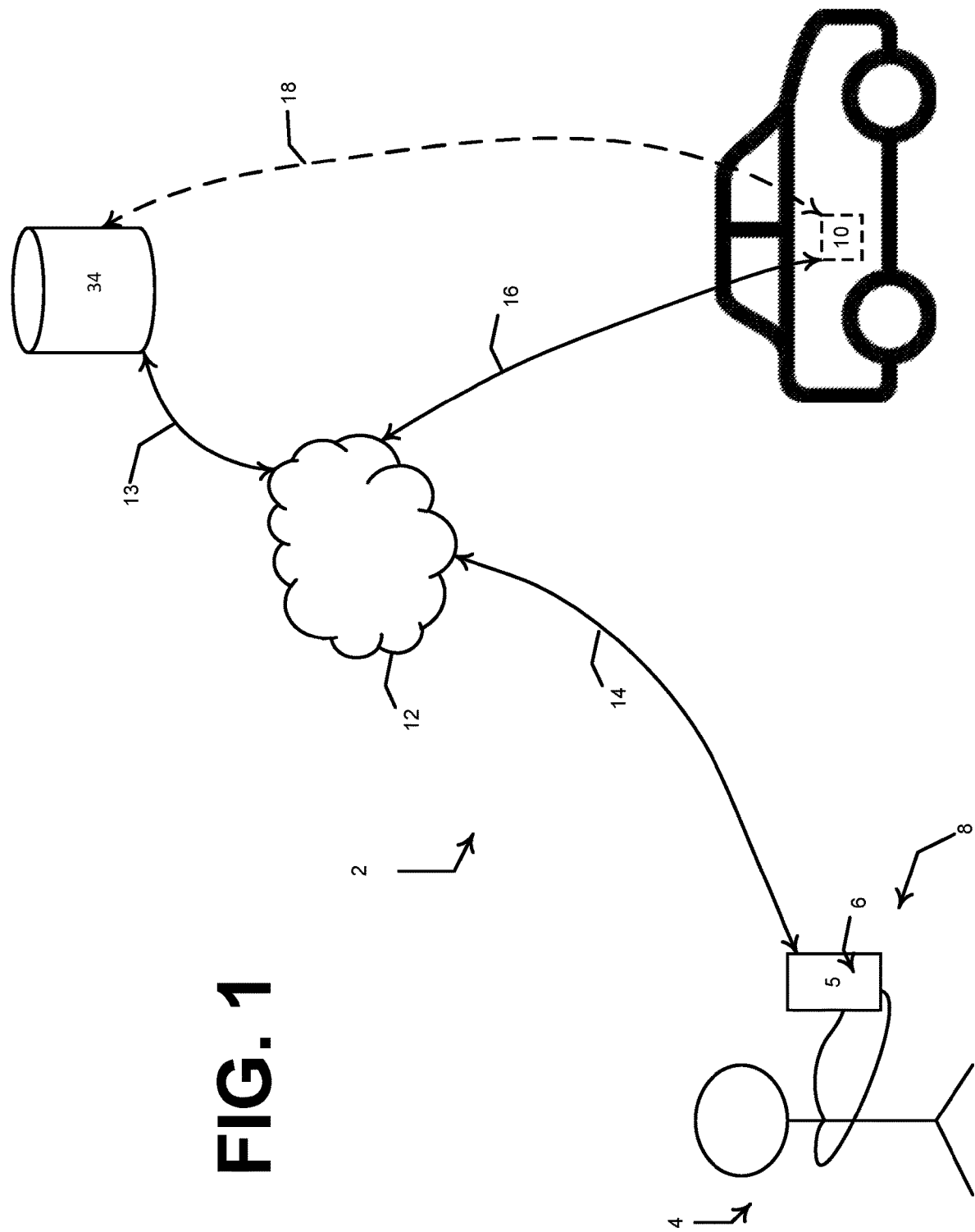
FIG. 1 illustrates a network environment of a user using a tracking device application running on a smartphone to monitor the location and status of a tracking device.

As a preliminary matter, it will be readily understood by those persons skilled in the art that the present embodiments are susceptible of broad utility and application. Many methods, embodiments, and adaptations of the present application other than those herein described as well as many variations, modifications and equivalent arrangements, will be apparent from or reasonably suggested by the substance or scope of the various embodiments of the present application.

Accordingly, while the present application has been described herein in detail in relation to various embodiments, it is to be understood that this disclosure is illustrative of one or more concepts expressed by the various example embodiments and is made merely for the purposes of providing a full and enabling disclosure. The following disclosure is not intended nor is to be construed to limit the present application or otherwise exclude any such other embodiments, adaptations, variations, modifications and equivalent arrangements, the present embodiments described herein being limited only by the claims appended hereto and the equivalents thereof.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. In yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Turning now to the figures, FIG. 1 illustrates an environment 2 where user 4 may interact with a user interface 5 of an n application 6 running on a user equipment device ("UE") 8. For purposes of discussion a UE will typically be discussed herein as a wireless user device such as a smart phone, tablet, and the like, but it will be appreciated that a user's UE may also be another type of computing device, such as a desktop PC, a laptop PC, a user terminal coupled to a mainframe computer, and the like.

User application 6 may communicate with tracking device 10 or may receive information related to the tracking device from another device, such as a remote server. User equipment 8 and tracking device 10 may communicate via communications network 12 that may comprise a long-range wireless communication network such as an LTE network. Communication network 12 may also include the Internet. Tracking device management server 34 may be connected to communication network 12 via a wired internet connection or via a wireless internet connection, either of which may be referred to as communication link 13. UE 8 may communicate with communication network 12 via long-range wireless link 14 and tracking device 10 may communicate with network 12 via long-range wireless link 16. Communication path 18 is shown with a dashed line to indicate that server 34 may communicate with tracking device 10 even though the tracking device sends message signals to network 12 via link 16.

Tracking device 10 typically communicates with communication network 12 via wireless link 16, which typically includes a cell tower station (not shown), which communicates with network 12. The cell tower station may be referred to as an eNodeB, a gNodeB, a base station, a cell, or the like, may be part of network 12, and may comprise 5G New Radio components. Communication network 12 may include an evolved packet core network ("EPC") that includes various core node components, such as MME. Other core network component nodes may include, for example, a serving gateway ("SGW") and a packet gateway ("PGW"), neither of which are shown in FIG. 1. Network 12 may include a Home Subscriber Server ("HSS") that may be a component of network 12, or that may be a component of another network that may couple to the EPC network portion of network 12 via a PGW. It will be appreciated that cloud 12 may represent multiple networks including an EPC network, the Internet, and a mobile network operator's wireless network, and may include wireless components that operate according to standards set forth by 3rd Generation Partnership Project ("3GPP").

Figure 2:
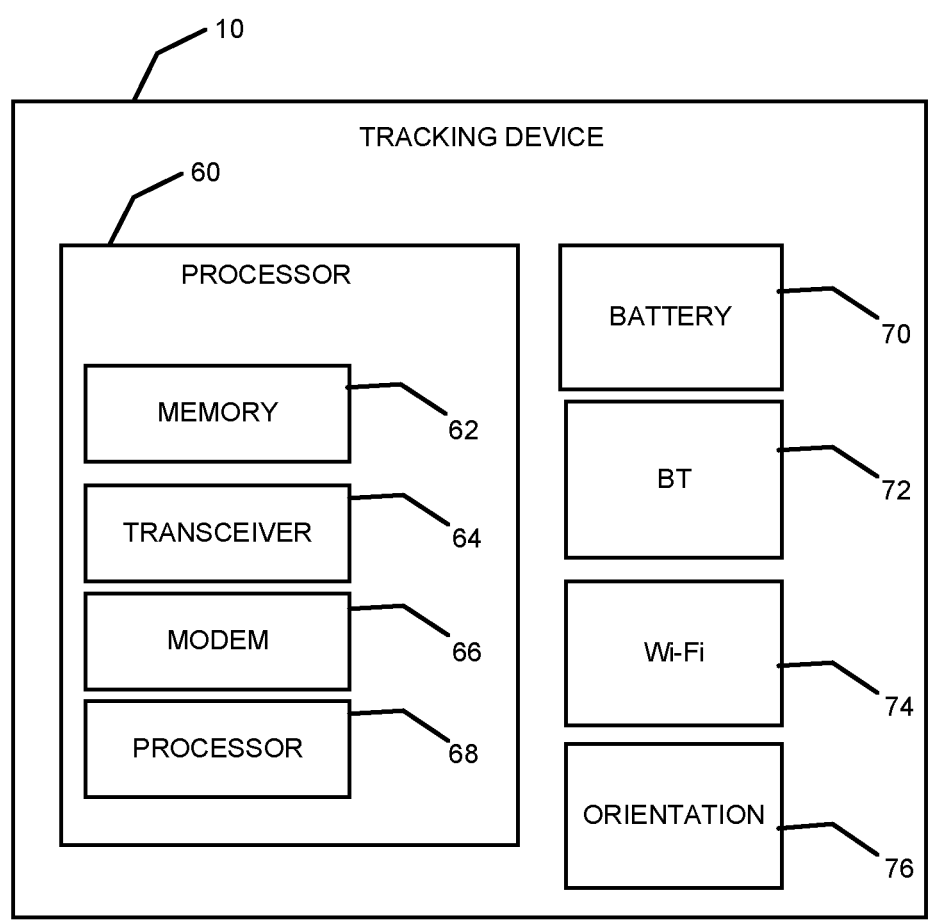
FIG. 2 illustrates a block diagram of a tracking device.

Turning now to FIG. 2, the figure illustrates a block diagram of tracking device 10. Tracking device 10 may include processor 60. In an embodiment, processor 60 may comprise a long-range wireless module, that includes memory portion 62, transceiver portion 64, modem portion 66, and a processor portion, or portions, 68. Processor module 60 may comprise a single integrated circuit or may comprise one or more discrete components mounted on a circuit board. Tracking device 10 may also include battery 70 and a short range-wireless module, or modules, for example Bluetooth module 72 or Wi-Fi module 74, GPS or Wi-Fi receive-only module for scanning for MAC addresses or Service Set Identifiers corresponding to nearby wireless hotspots.

Tracking device 10 may also include orientation module 76. Orientation module 76 may include only accelerometer sensors, such as may be included in micro electro-mechanical systems ("MEMS") devices. Accelerometer module 76 may also be part of an inertial measurement unit ("IME") that include gyroscopic sensors and magnetometer sensors as well as acceleration sensors (i.e., accelerometer components). Accordingly, orientation information received from sensors of tracking device 10 and used as discussed elsewhere herein may be generated by accelerometers of orientation module 76 and may be transmitted from the tracking device as accelerometer information signals. Orientation information received from sensors of tracking device 10 and used as discussed elsewhere herein may be generated by orientation module 76 and transmitted as orientation information signals from the tracking device. An inertial measurement unit ("IMU"), a device that may be used in orientation module 76 typically includes an accelerometer, a gyroscope, and a magnetometer per axis for each of the three vehicle axes: pitch, roll, and yaw. Orientation module 76 may include a processor that can be configured to determine orientation values from an orientation sensor of the module into orientation values and that may be used to determine when an orientation value satisfies an orientation change criterion, or when a difference between a baseline orientation value and an updated orientation value satisfies a predetermined orientation change criterion.

It will be appreciated that the components may be separate components on a circuit board or may be included in a single integrated circuit chip. Furthermore, one or more of components of processor 60 may be combined. For example, modem 66 and microprocessor portion 68 may be combined into a single integrated circuit, which transceiver circuitry, typically radio circuitry, may be circuitry separate from modem 66 and/or processor portion 68. In addition, memory 62 may be combined in an integrated circuit with components 64, 66, and 68, or may be a separate portion of processor 60. Memory 62 may in some cases not be part of processor 60, but instead may be a component separate from components 64-68 and may be part of tracking device 10 but may not be part of processor 60.

Figure 3:
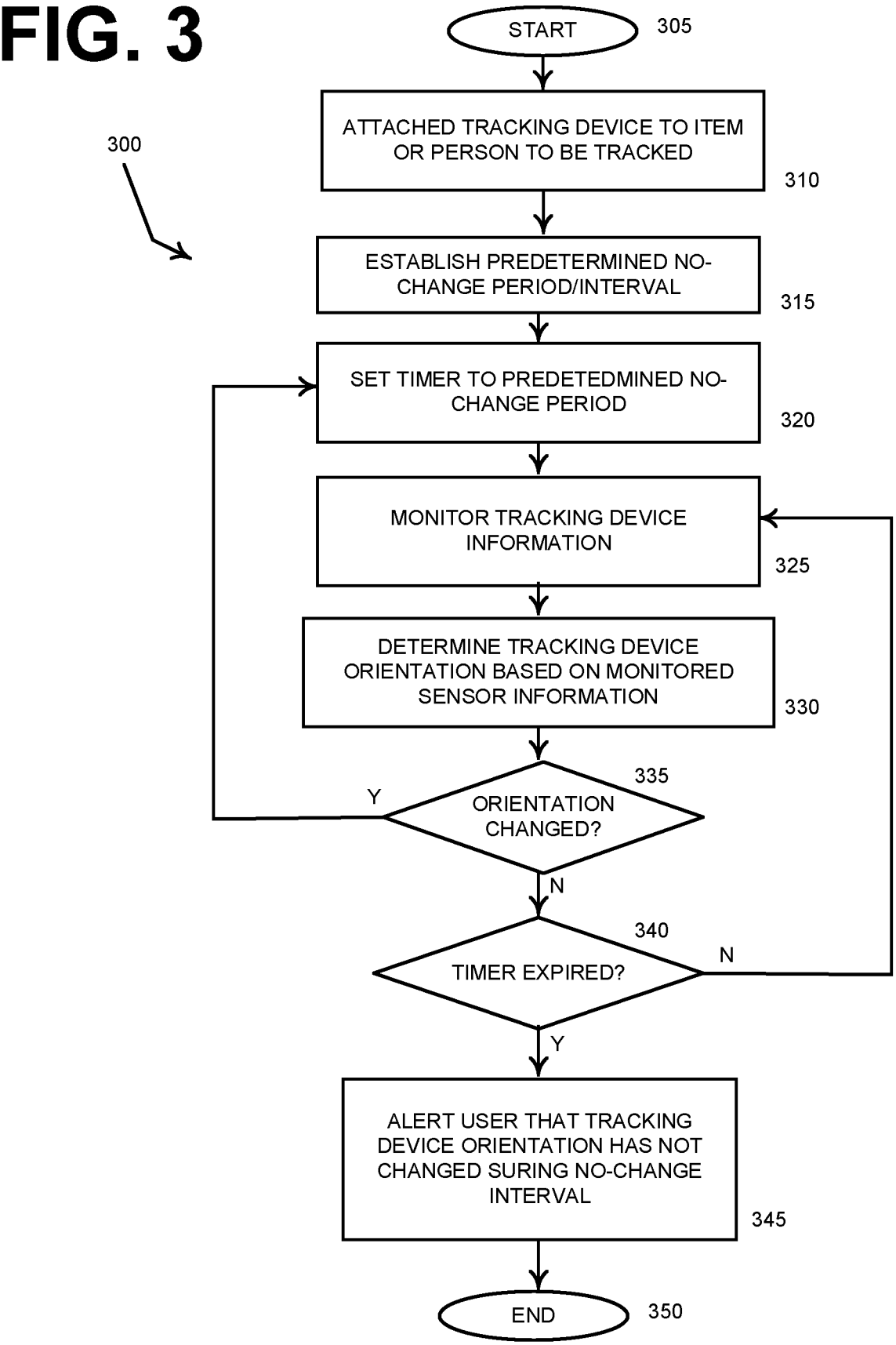
FIG. 3 illustrates a flow diagram of a method to determine that a tracking device has not moved according to a first embodiment.

Turning now to FIG. 3, the figure illustrates a flow diagram of a method 300 to determine whether a tracking device may have been removed from an item or object for which it is intended to track. Method 300 begins at act 305. At act 310 the tracking device is attached to an item to be tracked, such as, for example, a vehicle, or the tracking device is attached to a person, such as a special-needs person or a convicted criminal on parole from prison. At act 315 a user may select or establish a pre-determined no-change period, or no-change interval (the terms interval and period may be used interchangeably herein). For example, a user interested in tracking the location of an individual, such as a special needs child or a convicted criminal who has been released on parole, may want to ensure that the individual has not removed the tracking device. Or an operator of a vehicle fleet, such as a rental car fleet operator or a business owner who operates a fleet of trucks, where drivers tend to dislike their supervisor knowing their whereabouts, may want to monitor the location of their vehicles and ensure that the vehicles are not somewhere they are not supposed to be or that the vehicles are not idle for more than a predetermined amount of time based on typical usage or behavior of the item to be tracked, the individual to be tracked, or the nature of a job that a commercial vehicle is currently being used to perform. The user (e.g., an operator, a manager, a supervisor, or a parole officer) may select or establish a predetermined no-change interval/period based on expected movement of the item or person to be tracked. For example, if the item to be tracked is a truck of a shipping company's fleet of trucks, drivers may be required by government regulation to sleep a certain amount of time or at least not drive for a certain amount of time before continuing operation of the truck they are driving. For example, if a driver is required to refrain from driving for at least eight hours the fleet operator may established a predetermined no-change interval of eight hours, or perhaps eight hours plus an additional buffer/cushion amount, for example 30 minutes.

Because it is expected that during the predetermined no-change interval the tracking device will not move, non-movement during the no-change interval may not cause concern with the fleet operator user monitoring the whereabouts of the tracking devices (and thus the whereabouts of the truck being tracked). This is because the operator does not expect the item, such as a truck, to move during the predetermined no change interval—the operator expects that the driver of the truck will obey the government regulation that mandates that drivers take a certain amount of 'off time.' However, if information received from the tracking device does not indicate movement during, or by the end of, the predetermined no-change interval, the fleet operator may want to know this and investigate further.

At act 320 a user/operator/manager sets a pre-determined no-change period timer at a baseline time with the tracking device attached to the device to be tracked at a baseline orientation. The no-change interval timer may be set using an application running on a user equipment device such as a wireless smartphone or tablet, a personal computer, or any Internet-connected device. Or the user may select the predetermined no-change interval using an interface such as a web page hosted by a tracking device monitoring server or an application hosted by the tracking device monitoring server.

At act 325, monitoring of information received from the tracking device may be performed. The monitoring of information received from the tracking device may be performed by a user equipment device such as a wireless smartphone or other Internet-connected device of personnel interested in knowing the whereabouts of an item or person to be tracked, or a tracking device management server may monitor information received from the tracking device and may perform evaluation of the received information. Information monitored and evaluated may include information generated by orientation sensors, such as accelerometer sensors, gyroscopic sensors, or magnetometers, contained in the tracking device, for example, sensors of an IMU. Orientation sensors may provide movement information in three axes, for example an x axis, a y-axis, and a z-axis. Accelerometer sensors, for example, typically provide signals that correspond to movement of the accelerometer sensor in a gravitational field. In other words, an accelerometer sensor provides an output signal that changes as the sensor's orientation of the accelerometer signal changes with respect to gravity. If a tracking device that includes one or more accelerometer sensors does not move, signals produced by the accelerometer sensor, or sensors, typically will not change.

At act 330 an application running on a user equipment device such as a smartphone, a personal computer, or an application running on a tracking device management server, may determine the orientation of the tracking device based on one or more orientation signals received from one or more orientation sensors of the tracking device relative to a previous determination of orientation of the tracking device.

At act 335 the application that determines orientation of the tracking device based on the orientation sensor signals may determine whether the orientation of the tracking device has changed; if a determination is made at act 335 that orientation of the tracking device has changed method 300 returns to act 320 and continues as discussed above.

If the application making the determination whether the orientation of the tracking device has changed determines at act 335 that the orientation determined at act 330 of the tracking device has not changed relative to a determination of orientation of the tracking device made at a previous iteration of act 330 during the predetermine no-change period, method 300 advances to act 340.

The determination of a change in orientation may be made by comparing baseline orientation values representing orientation signals generated by the tracking device at a baseline time with new, or updated, orientation values corresponding to new, or updated, orientation signals, generated but the same corresponding orientation sensors of the tracking device. As discussed below in the discussion relative to act 340, if the comparison indicates a change of more than a predetermined amount, which may be an amount predetermined to account for error measurement error associated with the orientation sensors, during, or at the end of the predetermined no-change period, a determination may be made that the orientation of the tracking device that includes orientation sensors has changed.

At act 340 the application determines whether the no-change period timer that was set at act 320 has expired. If the predetermined no-change period has not expired method 300 returns to act 325 and continues as discussed above.

If a determination is made at act 340 that the no-change period has expired method 300 advances to act 345 and the application running on the user equipment device may provide the user with an alert or the application running on the tracking device management server may generate an alert and transmit that alert to a user equipment device of a user who is interested in knowing the whereabouts of the device being tracked. The alert may indicate that the orientation of the tracking device has not changed during the predetermined no-change period, or the alert may provide the user with a message that simply indicates that the tracking device may have been removed from the item to be tracked or the individual to be tracked. Method 300 ends at act 350.

Figure 4:
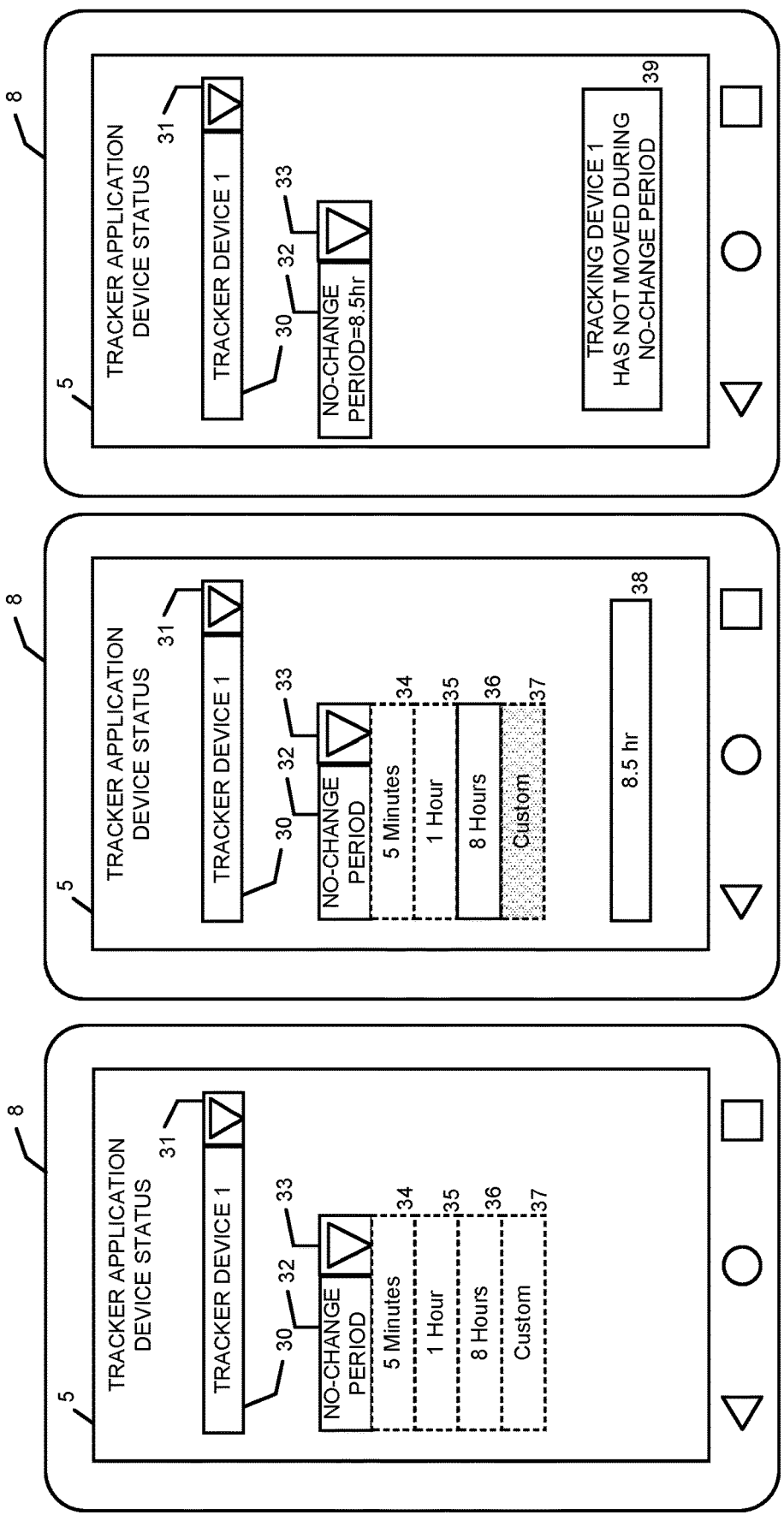
FIG. 4 illustrates a user interface that provides status information corresponding to a selected tracking device.

Turning now to FIG. 4, the figure illustrates a user interface 5 of application 6 running on user equipment device 8. User interface 5 may be part of a tracking application 6 and as shown in the figure may display various status or alert information relative to a selected tracker device. Tracking device 1, as shown in selection box 30 has been selected. Control item 31 enables a user to invoke a dropdown box so that one of multiple tracking devices may be selected for displaying by application 6 of status or alert information corresponding to the selected tracking device. No-change period message box 32 and its associated control item 33 show in FIG. 4 view A provide a plurality of example configured or determined no-change intervals/periods that may be selected: a five-minute period 34, a one-hour period 35, an eight hour period 36, and a custom period 37. If custom period 37 is selected a custom dialog box 38 may open to allow a user of application 6 to enter a different no-change period than the preconfigured values as shown in items 34, 35, or 36. For example, an operator of a fleet of long-haul trucks may wish to add time to a government-mandated rest time that its truckers may be legally obligated to follow. If the government-mandated rest period is eight hours, the fleet operator may choose a predetermined no-change period of 8½ hours by entering 8½ hours into custom dialog box 38. In the example shown in FIG. 4, a user of application 6 has selected the custom period 37 as shown by the highlighted preconfigured value of "Custom" in view B, and has entered "8.5 hr" into the custom dialog box 38. In view C user interface 5 of application 6 shows the displaying of an alert message 39 when application 6 running on UE 8 has not received information indicating that Tracking Device 1, which is selected in selection box 30, has not moved during the predetermined no-change period as shown in no-change message box 32.

Figure 5:
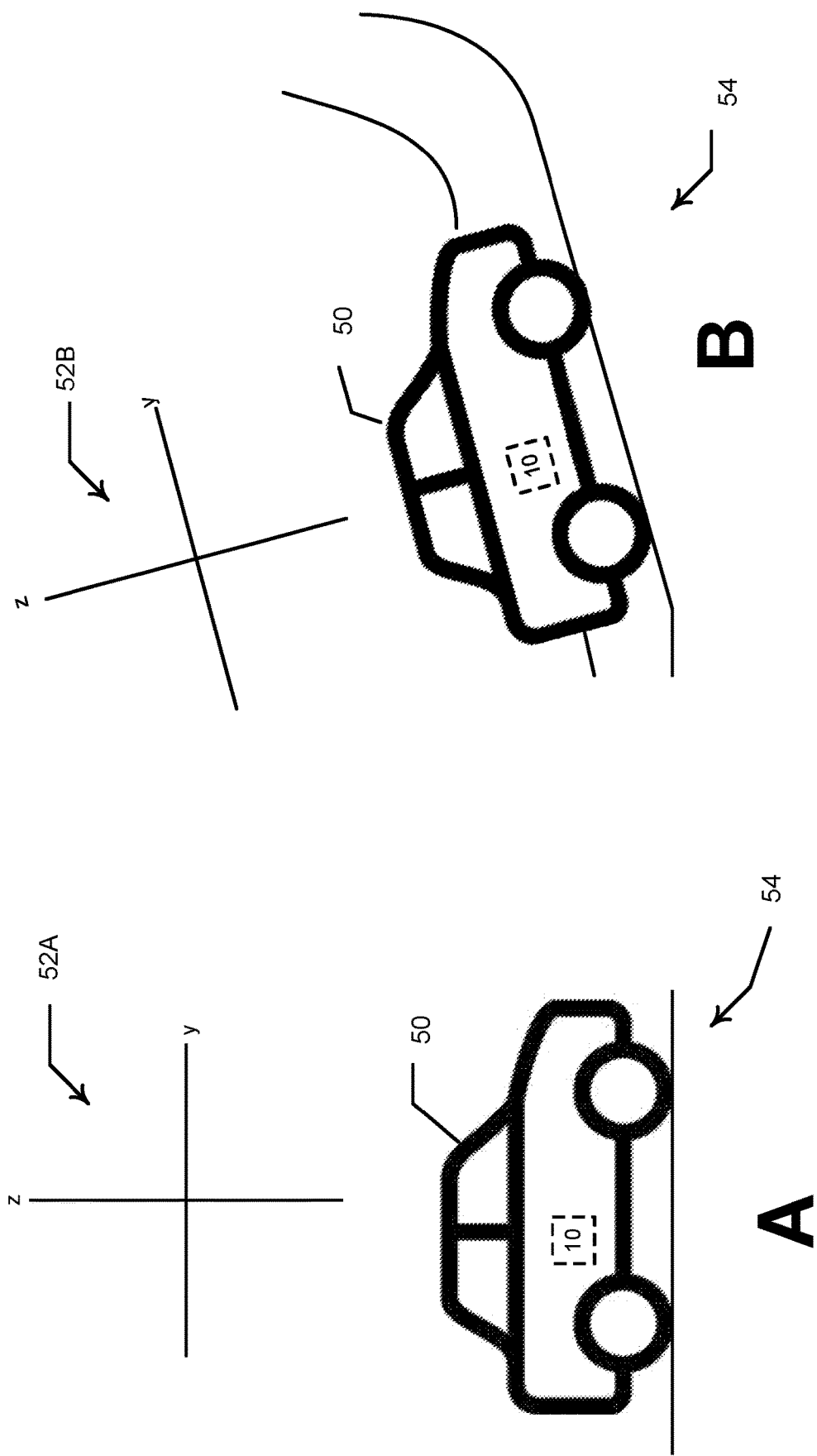
FIG. 5 illustrates a tracking device attached to a vehicle with axes corresponding to the orientation of the tracking device and associated vehicle.

Turning now to FIG. 5, the figure illustrates vehicle 50 traveling along road 54. Vehicle 50 includes tracking device 10, which is shown in the middle of the vehicle but may be attached anywhere to vehicle 50. In FIG. 5 view A axes 52A corresponds to the orientation of tracking device 10, as well as the orientation of vehicle 50, as the vehicle travels along road 54, which is shown in view A as a level surface. It will be appreciated that the coordinate system represented by the three axes x, y, and z in the figure typically correspond to accelerometer sensor signals that may be generated by accelerometers of orientation module 76 of tracking device 10. However, if orientation module 76 of tracking device 10 includes an IMU, the axes may indicate roll, pitch, and yaw. Roll, pitch, and yaw may be calculated from accelerometer signal information provided in an x, y, z coordinate system. For purposes of discussion of FIG. 5, and discussion of FIG. 6, infra, it is more relevant to note the change in axes orientation corresponding to orientation change of vehicle 50 than to focus on what parameters the axes' coordinate system may refer to.

As vehicle 50 travels along road 54 the road transitions from a level surface to an incline surface (i.e., a hill). Axes 52B is shown rotated such that the z axis and the y axis have changed their orientation such that they correspond to the change in orientation of tracking device 10 (and vehicle 50) as the vehicle is now climbing hill on road 54 as opposed to traveling along a flat surface as shown in FIG. 5 view A.

Figure 6:
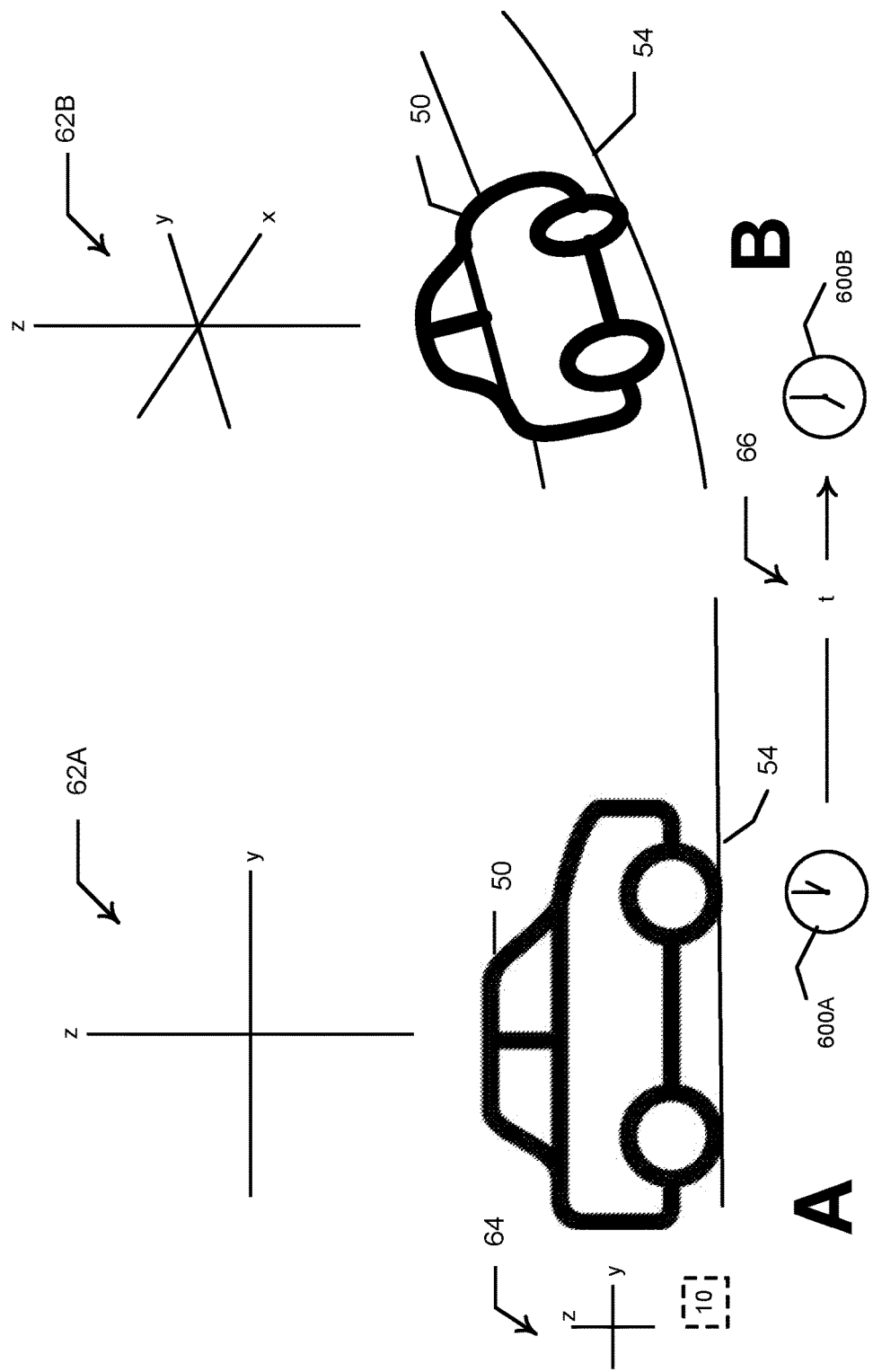
FIG. 6 illustrates a tracking device that has been removed from a vehicle with axes showing the orientation of the vehicle relative to the orientation of the vehicle when the tracking device was removed therefrom.

Turning now to FIG. 6, the figure illustrates vehicle 50 traveling along road 54. FIG. 6 view A is shown at time 600A, which as shown in the figure is 1:00 o'clock. As shown in FIG. 6 view A, tracking device 10 is no longer attached to vehicle 10. Instead, tracking device 10 has been removed from vehicle 50 and left somewhere, for example along the side of road 54, in a garage owned by a driver of the vehicle, or some other location unattached to the vehicle. Axes 64 corresponds to the orientation of tracking device 10 where it has been left at time 600A, and axes 62A represents the orientation of vehicle 50 at time 600A. Regardless of the actual orientation of tracking device 10 at time 600A, axes 64 represents the orientation of the tracking device, which orientation may not be perfectly perpendicular with respect to road 54 as shown in 6A and is merely shown for reference to the orientation of vehicle 50 in views A and B of FIG. 6.

At time 600B, vehicle 54 has traveled along road 54 from its location at time 600A, which may be referred to as a baseline time. Determined time (t) 66, which may be referred to as a no-change interval, or period, may represent a predetermined amount of time at, or over which, a user application, or a tracking device management server, may query tracking device 10 to determine its orientation (i.e., the orientation of the tracking device as determined by accelerometer sensors of the tracking device, which tracking device orientation is represented by axes 64). As shown in FIG. 6 view B, at time 600B, which is shown as seven o'clock, vehicle 50 is following road 54 and making a left turn. Axes 62B represents the change in the orientation of vehicle 50 as the vehicle turns left while following road 54. Predetermined period t equals 7 hours in the figure but is configurable and may be whatever amount of time a user or an operator of tracking device management server 34 may choose as appropriate for a use to which tracking device 10 is being used. Thus, because tracking device 10 has been removed from vehicle 50, the orientation of the tracking device has not changed during, or by the end of, the predetermined update period/no-change period t (i.e., time 66 in the figure) and a presumption may be made by a user application that tracking device 10 has been removed from vehicle 50. Such a presumption may be made based on an assumption that a user of vehicle 50 typically does not leave the vehicle stationary for more than whatever predetermined period t the user has selected with user interface 5, or for which user application 6 has been configured, for checking on the orientation of the tracking device. The predetermined period t may be adjusted throughout a given day and may be adjusted differently on different days. For example, the predetermined period t may be set for five hours during a working day to account for time between arriving at work, going to lunch, returning from lunch, and leaving work for the day but period t may be set to ten hours during nighttime when a user may typically be sleeping.

Figure 7:
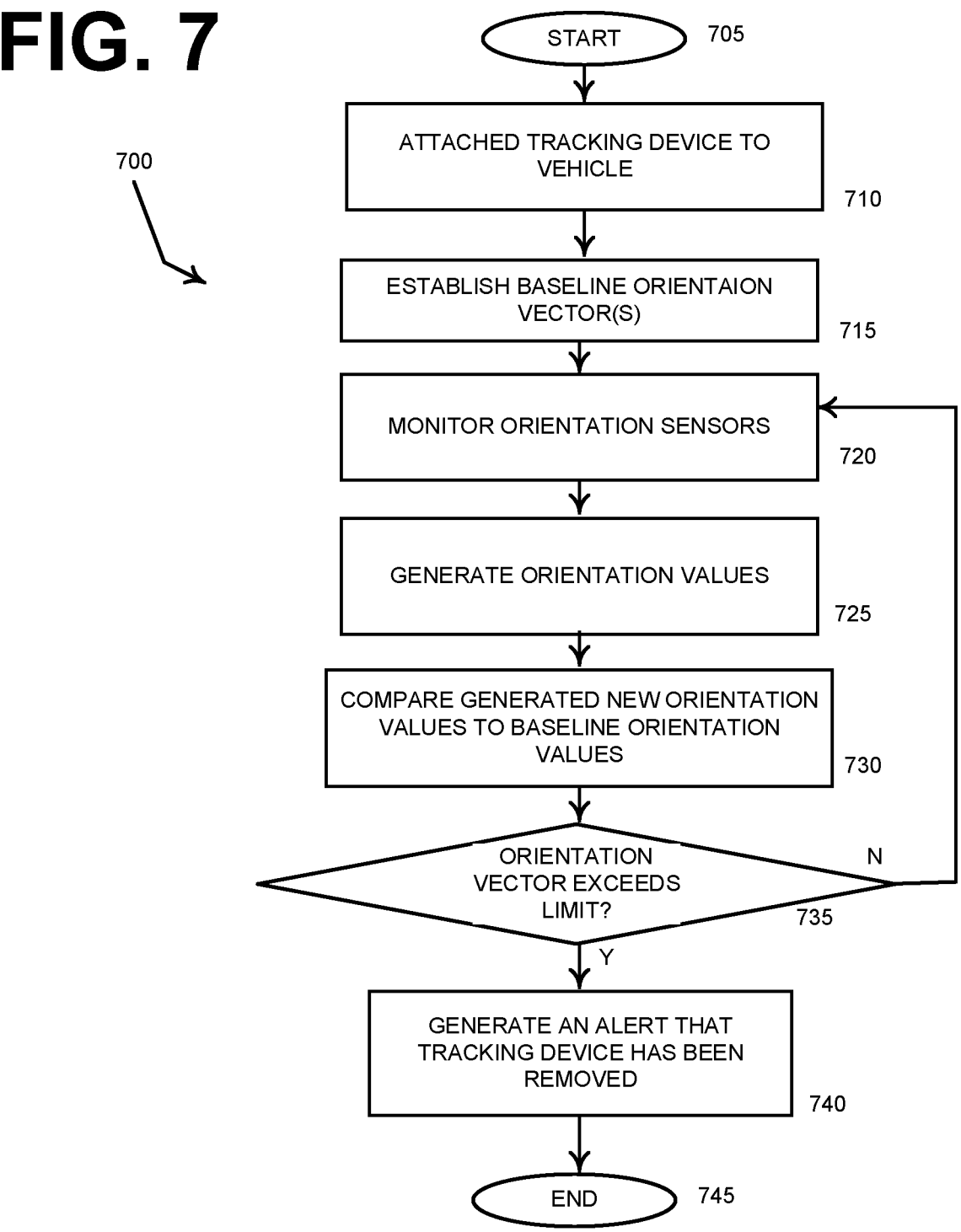
FIG. 7 illustrates a flow diagram of a method to determine that a tracking device has not moved according to a second embodiment.

Turning now to FIG. 7, the figure illustrates a flow diagram of method 700 to determine that a tracking device may not have moved according to a second aspect. Method 700 begins at act 705. At act 710 a user, such as a vehicle fleet manager, may place a tracking device in a vehicle or attaches the tracking device to the vehicle. Preferably, the tracking device will be placed in, or attached to, the vehicle such that the outer dimensions of the tracking device align with x, y, and z axes of the vehicle, wherein the x axis corresponds to lateral, or side-to-side movement of the vehicle, the y axis corresponds to forward or reverse movement of the vehicle, and the z axis is parallel with gravity and to vertical movement of the vehicle.

At act 715, a baseline orientation vector, or vectors is/are established. The orientation vector(s) may simply be value (s) that correspond to acceleration sensed by orientation sensors, such as accelerometers, of an orientation module of the tracking device. With the vehicle stationary at a baseline time, and thus the tracking device stationary at the baseline time, acceleration sensed by the orientation sensor is caused by gravity acting on the sensors. If, for example, the orientation sensors are accelerometers, with each aligned perpendicularly to one another, one sensor may be aligned with, and correspond to, the x axis of the vehicle, another sensor may be aligned with, and correspond to, the y axis of the vehicle, and the third sensor may be aligned with, and correspond to, the z axis of the vehicle. Such alignment of the orientation sensors with the axes of the vehicle may be the case if the tracking device is attached to the vehicle with the edges of the tracking device aligned with the axes of the vehicle (assuming a typical scenario where the tracking device has a housing formed with straight edges at 90 degrees to one another and where orientation sensors are mounted in the orientation module perpendicularly to the housing of the module and where the module is mounted in or installed in the tracking device such that each of the orientation sensors sense acceleration in a direction parallel to one or more edges of the tracking device housing). In such a scenario, the orientation sensor that senses acceleration in the vertical direction (i.e., z-axis of the vehicle) would output a signal that a processor of the tracking device would receive and convert to a value that equals acceleration due to gravity, or 9.81 N-M/sec$^2$, and the other sensors would output a signal that the processor of the tracking device would convert to a value of 0.00 N-M/sec$^2$. (It will be appreciated that the processor of the tracking device may be discrete from the orientation module or may be part of the orientation module.) Each of the values corresponding to a given one of the three axes would, in conjunction with the direction of the corresponding to given axis, constitute a vector. Thus, at the baseline position and time when the baseline values, or vectors, are established, the x and y vectors would be 0.00 N-M/sec$^2$ and the z vector would be 9.81 N-M/sec$^2$.

In another scenario, where the orientation sensors do not align with the axes of the vehicle, at the baseline time when the baseline vector(s) is/are established, gravity may cause all orientation sensors to generate an output signal because no single sensor aligns perfectly parallel with the direction of gravity. In such a scenario, no sensor will generate a signal that results in a processor of the tracking device generating a value, or vector, having a magnitude of 9.81 N-M/sec$^2$. In such a scenario, Euler's equations may be used to normalize baseline signals generated by the orientation module at the baseline time and position such that a processor of the tracking device may output a value, or vector, for the x, y, and z axes with values of 0.00, 0.00, and 9.81, respectively. Such manipulation of values corresponding to the signals generated by the orientation sensors may be referred to as 'rotation' where the true values are 'rotated' according to Euler rotation equations such that actual values from the orientation sensors are transformed from the frame of reference of the tracking device (i.e., the x, y, and z axes of the tracking device) to the frame of reference of the vehicle (i.e., the x, y, and z axes of the vehicle). Mathematical techniques that may perform such normalizing, or rotating, of frames of reference, are known and are not discussed in detail herein.

After establishing the baseline orientation values at act 715, at act 720 a processor of the tracking device begins monitoring orientation vectors corresponding to output signals that correspond to the x, y, and z axes of the vehicle generated by the orientation module. For purposes of discussion hereafter, it will be appreciated that reference to orientation vectors refers to 'rotated' vectors that have been 'aligned' with the x, y, and z axes of the vehicle to which the tracking device has been attached, even if the tracking device has not been attached to the vehicle such that the orientation sensors thereof align with the axes of the vehicle. Monitored orientation signals from the orientation module, and corresponding orientation vectors, that are generated after the establishment of the baseline orientation vector(s) may be referred to herein as new orientation vectors or updated orientation vectors.

At act 725 a processor of the tracking device compares the update orientation vectors to the baseline vectors and a difference value corresponding to the difference between the baseline vectors' values and updated vectors' value are compared to a predetermined orientation change criterion, for example, a deviation in 'pitch' of the tracking device of, or more than, 45 degrees. Predetermine pitch criterion values other than 45 degrees may be chosen instead. The principle underlying the choosing of the predetermined pitch criterion value may be that typical roads that a vehicle may travel on do not exceed an inclination of 45 degrees, or whatever predetermined pitch criterion value is chosen. Thus, if the orientation sensors result in vector values of x=0.00 N-M/sec$^2$, y=6.94 N-M/sec$^2$, and z=6.94 N-M/sec$^2$. The signal values may thus correspond to the tracking device being in an orientation that the vehicle would likely never encounter if the tracking device were attached to the vehicle in the same orientation as it was in the baseline orientation. (9.81×sin)(45°=6.94.) These signal values would result from the tracking device being inclined at a 45° angle in the x-z plane relative to the position the tracking device was in when the baseline vector values were established at act 715.

Thus, if the predetermined pitch criterion is a pitch of 45 degrees or greater, method determines at act 735 that the predetermined orientation change criterion, which may be a pitch criterion, has been exceeded and follows the 'Y' path to act 740 where a processor of the tracking device generates an alert that the predetermined pitch criterion was violated. If during a given iteration of acts 720, 725, 730, and 735 the monitoring at act 720 does not result in an evaluation of orientation signals from the orientation sensors corresponding to the predetermined pitch criterion being exceeded, method 700 follows the 'N' path from act 735 and returns to act 720 where a processor of the tracking device continues monitoring orientation sensor signals or corresponding orientation vector values. Method 700 ends at act 745.

Figure 8:
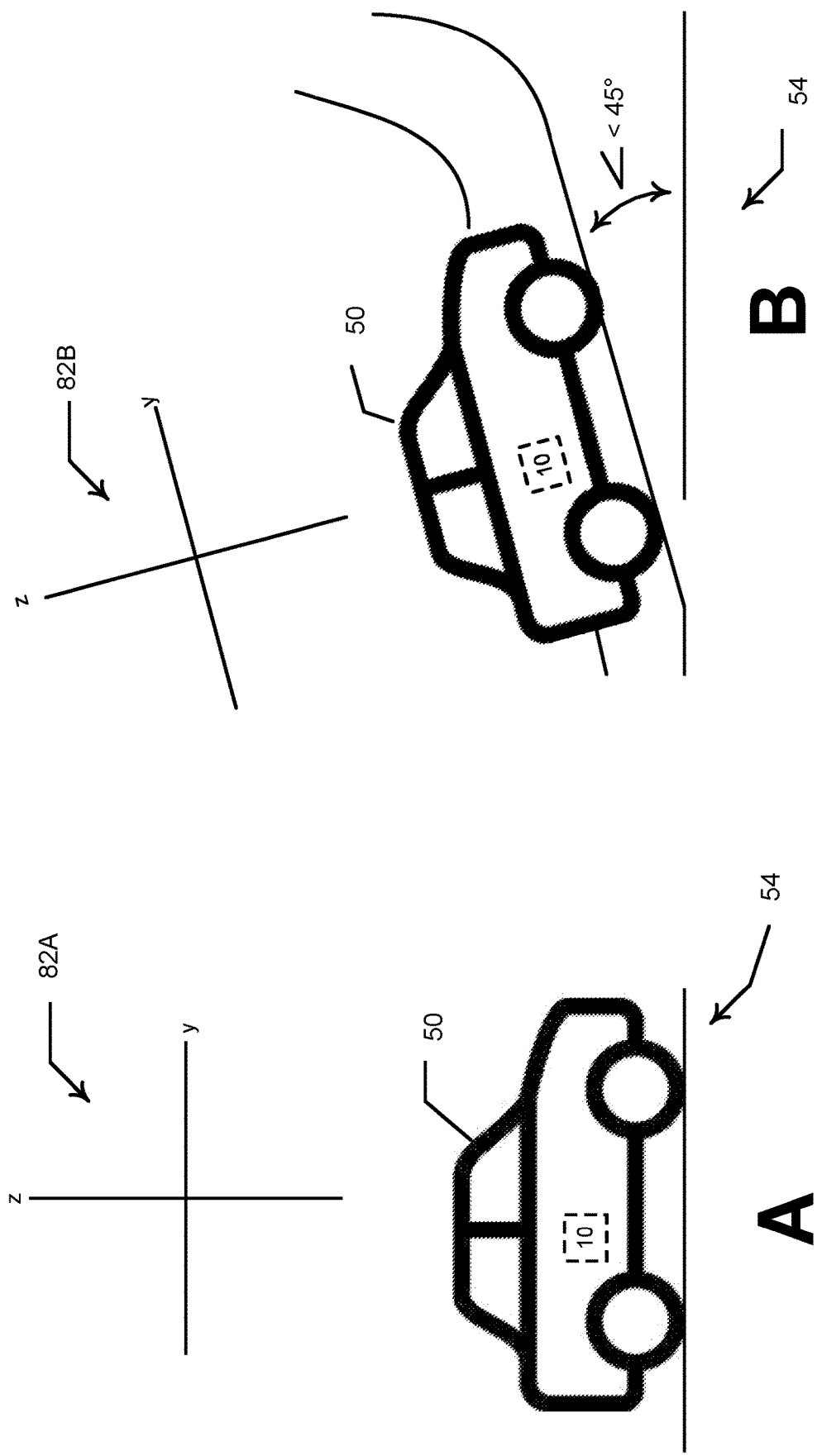
FIG. 8 illustrates a tracking device attached to a vehicle with axes corresponding to the orientation of the tracking device and associated vehicle.
Figure 10:
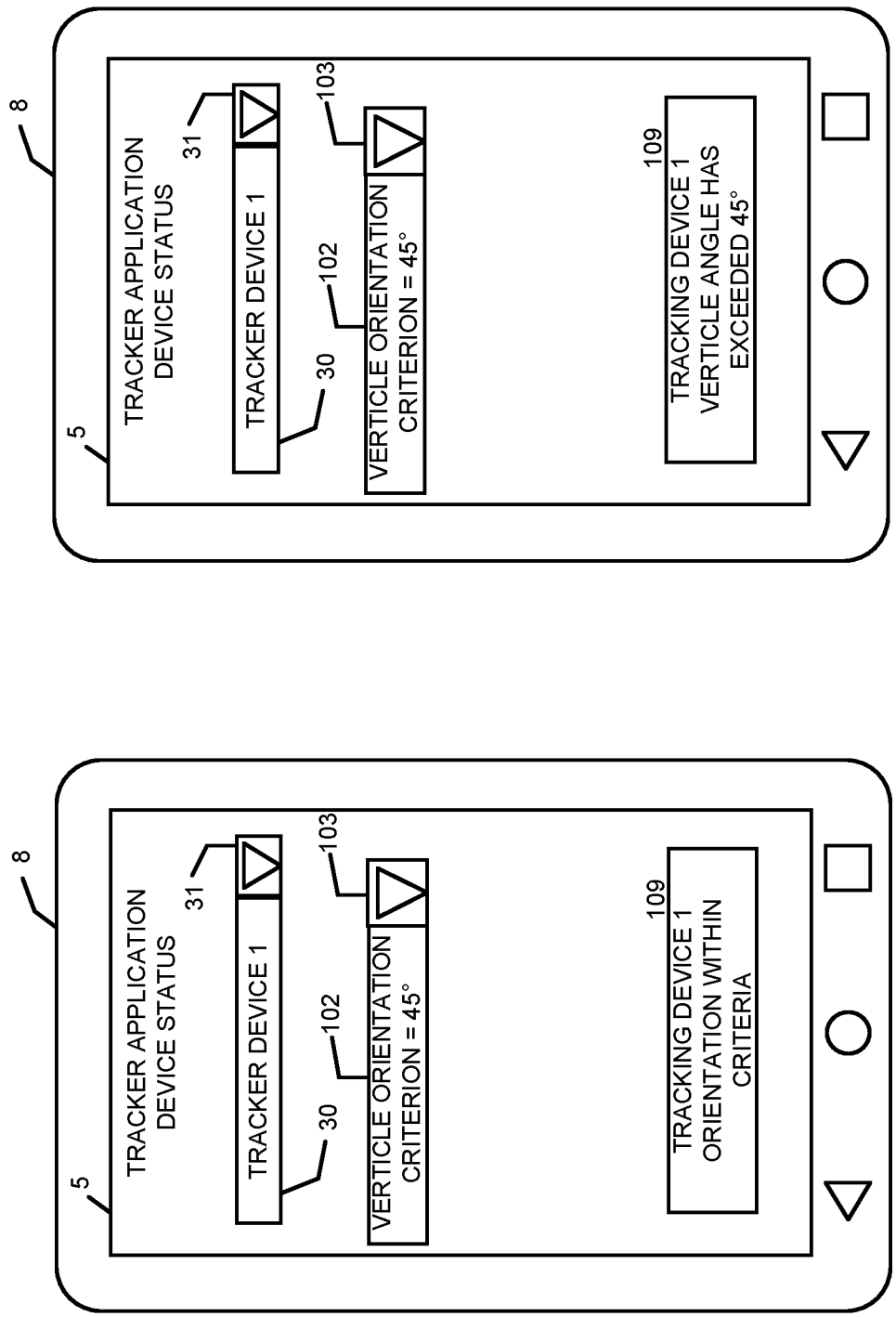
FIG. 10 illustrates a user interface of a tracking device application running on a user equipment device indicating that a vertical orientation of a selected tracking device has exceeded configured criteria.

Turning now to FIG. 8, the figure illustrates vehicle 50 with tracking device 10 attached thereto while traveling along road 54. Axes 82A in view A for FIG. 8 shows the orientation of vehicle 54 in the y-z plane, which as shown in the figure indicates a pitch value of 0° (i.e., the z axis is parallel to gravity and the y axis is perpendicular to gravity). In view B of FIG. 8, vehicle 50 is shown climbing a hill in road 54 wherein the hill has an inclination angle of less than 45°. For purposes of illustration, it is presumed that tracking device 10 is installed in, or attached to vehicle 50 such that the x, y, and z axes of vehicle axes set 82A are parallel to an x-y-z axes set of the tracking device If a predetermined inclination criterion, or pitch criterion, is set at 45° or greater, the orientation represented by either of axes sets 82A or 82B corresponds to a vertical inclination, or pitch, of less than 45 and thus the orientation of tracking device 10 and the corresponding orientation of vehicle 50, shown in either view A or view B of FIG. 8, does not exceed the criterion. Thus, a user application that provides information relative to tracking device 10 may provide an orientation criterion selection control item 103 for selecting an inclination angle criterion, or pitch angle criterion, of 45° 102, and may indicate acceptable orientation values corresponding to tracking device 10 as shown in message box 109 of view A of FIG. 10.

Figure 9:
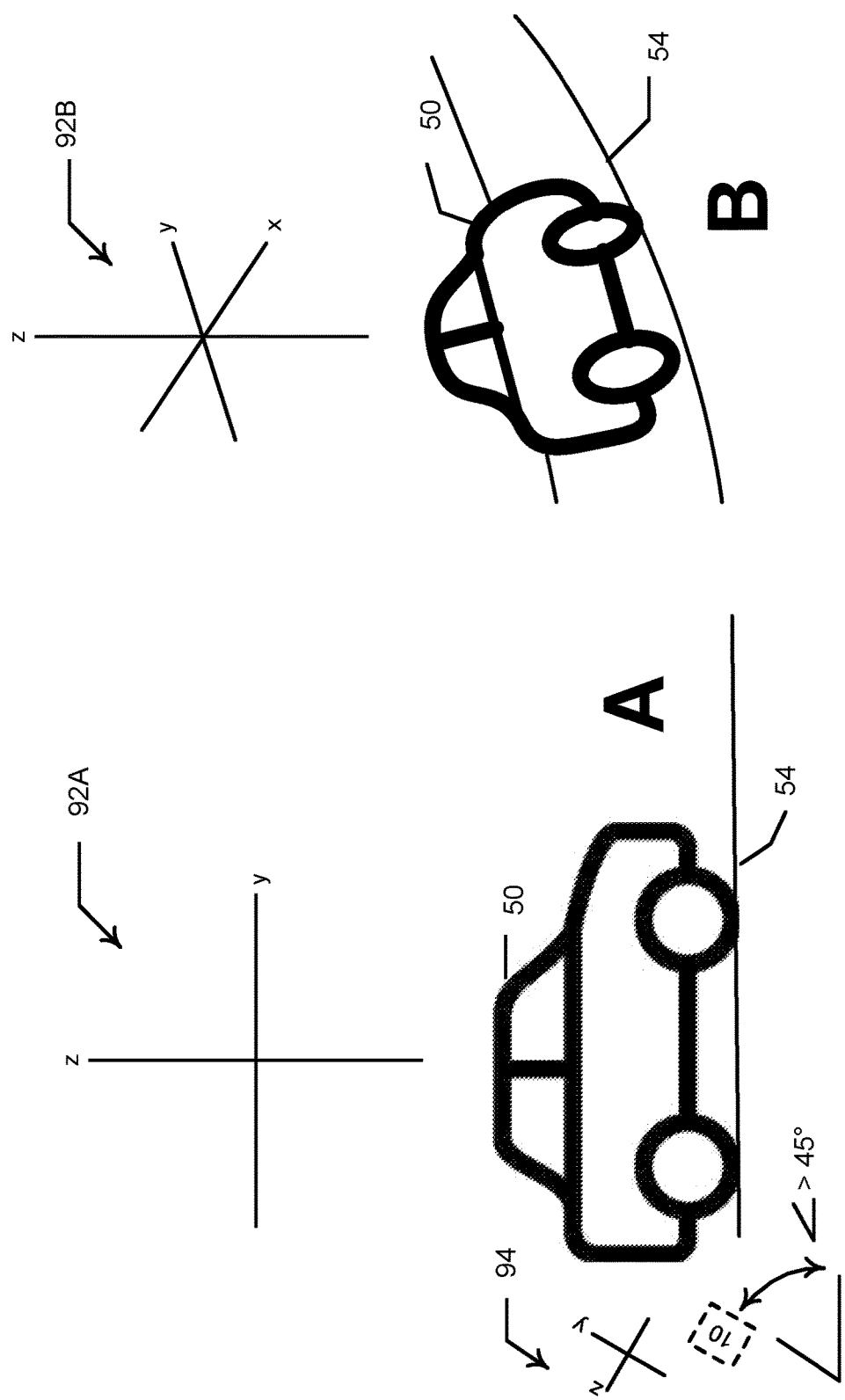
FIG. 9 illustrates a tracking device that has been removed from a vehicle with axes showing the orientation of the removed tracking device relative to the orientation of the vehicle.

If, however, a user removes tracking device 10 from vehicle 50 as shown in FIG. 9, the inclination angle, or pitch, of the tracking device may exceed the predetermine vertical inclination angle criterion of equal to or greater than 45°. As shown in view A of FIG. 9, the tracking device has been removed from vehicle 50 and has been left in an orientation where the y-z plane has changed about the x axis (i.e., x axis is pointing out of the page) by an amount greater than 45°, as represented by axes 94. Even as vehicle travels along road 54 and follows a left-hand curve as shown in view B of FIG. 9, the tracking device remains in the orientation represented by axes 94 shown in view A of FIG. 9. Since the pitch angle represented by axes 94 exceeds 45°, a processor of the tracking device may trigger the sending of an alert message to a user equipment device 8 such that user interface 5 displays an alert in message box 109 that the vertical inclination orientation angle has exceeded the predetermine criterion of 45° as shown in view B of FIG. 10. It will be appreciated that the processor of tracking device 10 that monitors and analyzes orientation signals generated by an orientation module of the tracking device may be part of the orientation module itself or may be another component of the tracking device that is discrete from the orientation module. For example, an MEMS device or an IMU device may include a processor that evaluates signals generated by sensors of the MEMS or IMU device and may be programmed to determine whether orientation values corresponding to orientation signals generated by the sensors meet, or do not meet, predetermined criteria that may be hard-coded into a memory of the orientation module, or that may be programmed into a memory of the tracking device that is discrete from the orientation module.

In an embodiment, programming stored in a memory of either the tracking device or of the MEMS (or IMU) may include artificial intelligence programming that updates its algorithm(s) while a tracking device is installed into a vehicle to automatically determine a desirable predetermined inclination angle criterion. For example, when a tracking device is placed into service attached to a vehicle, programming of the processor of the tracking device may include a default not-to-exceed inclination angle criteria of 45° as discussed in reference to FIGS. 7, 8, 9, and 10. As the vehicle is driven during a predetermined learning period, the artificial intelligence algorithms may update coefficients thereof to reflect actual driving activities, or geographical areas or routes, of one or more drivers of the vehicle in which, or to which, the tracking device is placed or attached. Such a determination of a more desirable inclination angle criterion that deviates from a default value may be determined by a manufacturer and then applied to all tracking device it makes and sells thereafter. Or, a given vehicle fleet operator, or even an operator of a single vehicle, may use artificial intelligence programmed into the tracking device to determine an optimal inclination angle criterion that minimizes false positive alerts but that is sensitive enough to determine that the tracking device has been removed from the vehicle. For example, if a fleet operator operates its vehicle only in Houston, Texas which is situated in a generally flat geography, after driving one or more vehicles of the fleet in actual service with the tracking device(s) installed and in a learning mode (artificial intelligence algorithm operates such that it applies actual data acquired during in situ service and refines its coefficients, factors, or other portions of the algorithm to produce better, more accurate output), the algorithms of the processor of the tracking device may begin with a default inclination angle criterion of 45° but then determine that a criterion of 20° would not result in an unacceptable number of false positive alerts (because the geography is so flat, normal driving in and around Houston would not typically encounter road or driveway inclines of more than 20°). On the other hand, if a fleet operator operates primarily in Colorado or Tennessee where very steep hills are often encountered, the algorithm of the tracking device may begin with a default inclination criterion value of 45° but may automatically determine while vehicle(s) in the fleet are driven with the tracking device installed and operating in learning mode, that the criterion needs to be increased to 50° because normal driving of the fleet vehicle often encounters inclines of greater than 45° but less than 50°. It will be appreciated that the automatic determining of a predetermined inclination angle criterion may be performed while the tracking device processor is in learning mode, but without the use of GPS information from a GPS module of the tracking device. It will be appreciated that in an embodiment GPS information from a GPS module of the tracking device may be used to determine a, or to refine an already-determined, vertical inclination angle criterion, or pitch criterion, relative to a default value.

It will be appreciated that as shown in FIG. 9, tracking device 10 is shown in a stationary position with an inclination angle in the y-z plane of greater than 45° but that the processor of the tracking device (the processor being either part of an orientation module of the tracking device or discrete from the orientation module) may be constantly (i.e., periodically) monitoring orientation signals generated by orientation sensors of the orientation module such that if someone removes the tracking device from its installed orientation and places the tracking device in a position such that the orientation of the tracking device is substantially the same in the y-z plane as before the tracking device was removed, but the orientation in the y-z plane exceeded the predetermined vertical inclination criterion during removal, regardless of whether the criterion is a default value or a valued refined during a learning mode, the processor of the tracking device may still generate and transmit to a user application an alert that the tracking device was oriented such that the vertical inclination in the y-z plane exceeded the predetermined criterion even if the orientation in the y-z plane at the final resting place of the tracking device after its removal does not exceed the criterion. Thus, a monitoring rate, or sample rate, (e.g., performance of acts 720, 725, 730, and 735 of FIG. 7) that is higher, or more frequent, than the amount of time it may take an individual to remove a tracking device from a vehicle and place it in a final resting place may be desirable. For example, a monitoring rate/ sample rate/iteration rate of acts 720, 725, 730, and 735 of FIG. 7 that has a frequency higher than, for example, 1 sample per second, may be desirable. It will be appreciated that the determination of an iteration rate of acts 720, 725, 730, and 735 of FIG. 7 may be determined with the tracking device in a learning mode such that the algorithm running on a processor of the tracking device monitors multiple removals of the tracking device and placing the tracking device in various positions and locations after removal to ensure a high likelihood of detection of an orientation that exceeds the predetermined inclination criterion.

In an embodiment, a suddenly high value from any one or one more orientation sensors of the orientation module may be deemed to be caused by either a vehicle crash, or the removal of the tracking device from the vehicle (i.e., if the tracking device is attached with Velcro, ripping the tracking device from the vehicle might cause a magnitude spike in the signal levels (i.e., voltage) of one or more orientation sensors that would be unlikely during normal driving conditions). In such a scenario a processor of the tracking device may instruct a GPS module of the tracking device to power on and provide GPS coordinate information that identifies where the tracking device is located. Providing location coordinates would be desirable after a crash so that a fleet operator or an emergency services provider would know where to send help. But, knowing GPS coordinate might also be useful in understanding whether a user has removed a tracking device from a vehicle but has been careful not to disturb, during the removal, the orientation of the x, y, and z, axes relative to their orientation before the user removed the vehicle. GPS information may include absolute elevation information in addition to latitude and longitude coordinates. Thus, an abnormally high magnitude of an orientation signal generated by an orientation sensor of an orientation module of a tracking device may be used to trigger turning on of GPS circuitry of the tracking device (the GPS may stay 'off' most of the time since minimizing 'on' time of GPS circuitry is desirable to reduce battery charge that the tracking device consumes) and to use elevation information generated by the GPS to assist in determining that the tracking device may have been removed from the vehicle when values corresponding to magnitudes of orientation signals generated by the sensors after the high magnitude event do not exceed predetermined inclination angle criterion.

Figure 11:
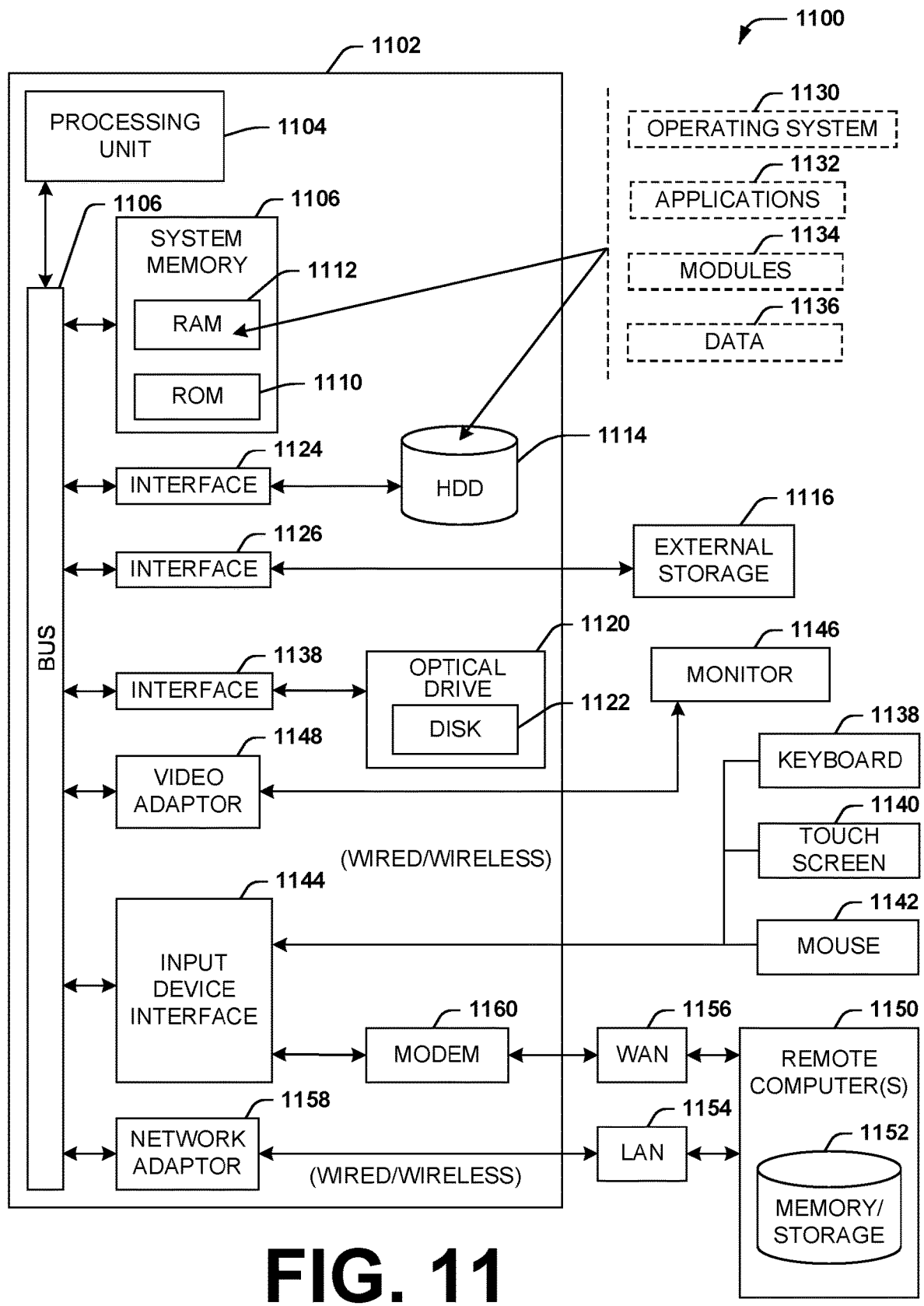
FIG. 11 illustrates an example computer environment.

In order to provide additional context for various embodiments described herein, FIG. 11 and the following discussion are intended to provide a brief, general description of a suitable computing environment 1100 in which various embodiments of the embodiment described herein can be implemented. While embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The embodiments illustrated herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors and may include a cache memory. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

Computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid-state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can comprise a security module, such as a trusted processing module (TPM). For instance, with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are example and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 12:
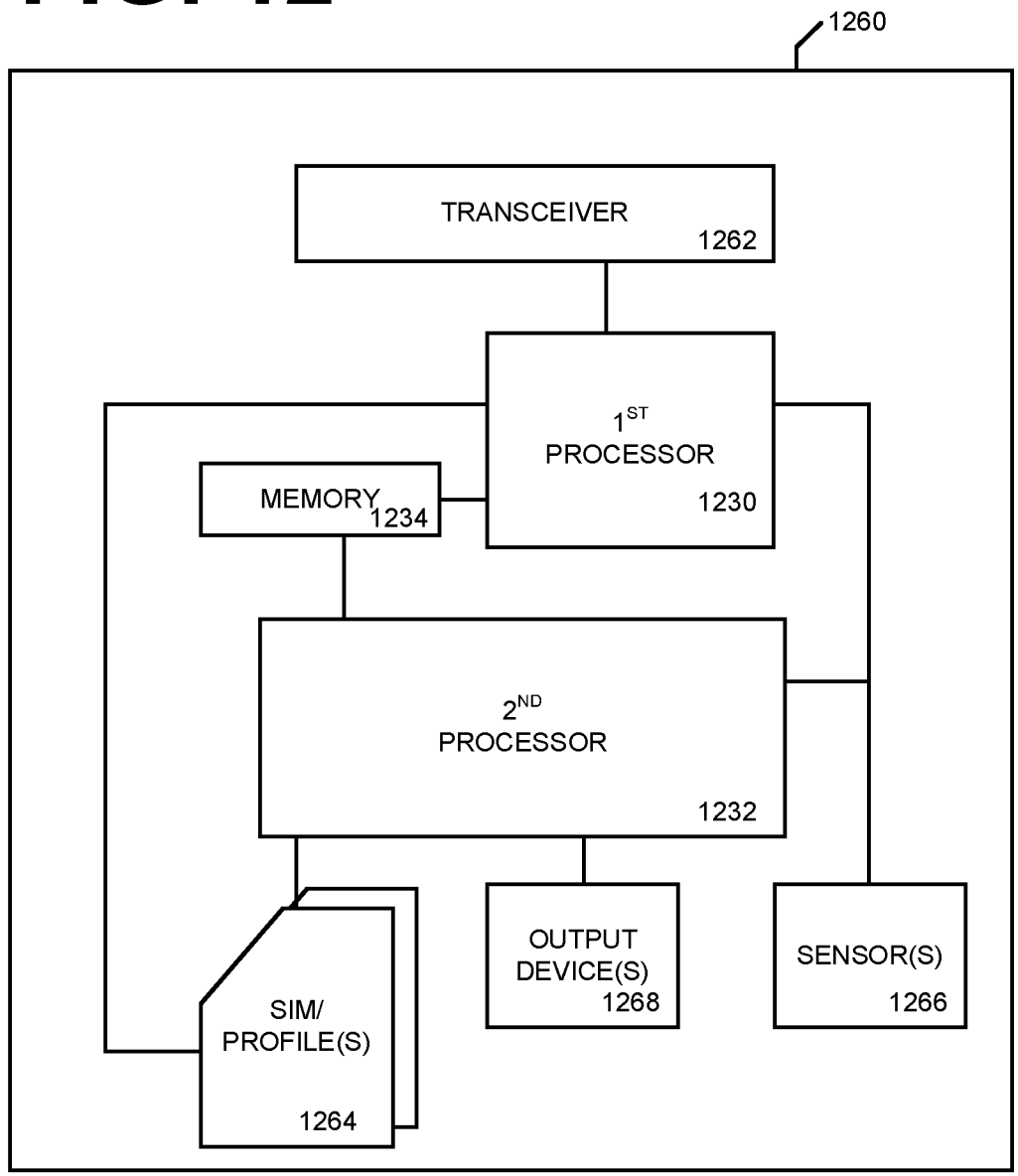
FIG. 12 illustrates a block diagram of an example wireless UE.

Turning now to FIG. 12, the figure illustrates a block diagram of an example UE 1260. UE 1260 may comprise a smart phone, a wireless tablet, a laptop computer with wireless capability, a wearable device, a machine device that may facilitate vehicle telematics, and the like. UE 1260 comprises a first processor 1230, a second processor 1232, and a shared memory 1234. UE 1260 includes radio front end circuitry 1262, which may be referred to herein as a transceiver, but is understood to typically include transceiver circuitry, separate filters, and separate antennas for facilitating transmission and receiving of signals over a wireless link. Furthermore, transceiver 1262 may comprise multiple sets of circuitry or may be tunable to accommodate, for example, different frequency ranges, different modulations schemes, or different communication protocols, or to facilitate long-range wireless links, device-to-device links, or short-range wireless links.

Continuing with description of FIG. 12, UE 1260 may also include a SIM 1264, or a SIM profile, which may comprise information stored in a memory (memory 34 or a separate memory portion), for facilitating wireless communication with RAN 105 or core network 130 shown in FIG. 1. FIG. 12 shows SIM 1264 as a single component in the shape of a conventional SIM card, but it will be appreciated that SIM 1264 may represent multiple SIM cards, multiple SIM profiles, or multiple eSIMs, some or all of which may be implemented in hardware or software. It will be appreciated that a SIM profile may comprise information such as security credentials (e.g., encryption keys, values that may be used to generate encryption keys, or shared values that are shared between SIM 1264 and another device, which may be a component of RAN 105 or core network 130 shown in FIG. 1). A SIM profile 1264 may also comprise identifying information that is unique to the SIM, or SIM profile, such as, for example, an International Mobile Subscriber Identity ("IMSI") or information that may make up an IMSI.

SIM 1264 is shown coupled to both the first processor portion 1230 and the second processor portion 1232. Such an implementation may provide an advantage that first processor portion 30 may not need to request or receive information or data from SIM 1264 that second processor 1232 may request, thus eliminating the use of the first processor acting as a 'go-between' when the second processor uses information from the SIM in performing its functions and in executing applications. First processor 1230, which may be a modem processor or baseband processor, is shown smaller than processor 1232, which may be a more sophisticated application processor, to visually indicate the relative levels of sophistication (i.e., processing capability and performance) and corresponding relative levels of operating power consumption levels between the two processor portions. Keeping the second processor portion 1232 asleep/inactive/in a low power state when UE 1260 does not need it for executing applications and processing data related to an application provides an advantage of reducing power consumption when the UE only needs to use the first processor portion 1230 while in listening mode for monitoring routine configured bearer management and mobility management/maintenance procedures, or for monitoring search spaces that the UE has been configured to monitor while the second processor portion remains inactive/asleep.

UE 1260 may also include sensors 1266, such as, for example, temperature sensors, accelerometers, gyroscopes, barometers, moisture sensors, GPS circuitry, Wi-Fi hotspot scanners and the like that may provide signals to the first processor 1230 or second processor 1232. Output devices 1268 may comprise, for example, one or more visual displays (e.g., computer monitors, VR appliances, and the like), acoustic transducers, such as speakers or microphones, vibration components, and the like. Output devices 1268 may comprise software that interfaces with output devices, for example, visual displays, speakers, microphones, touch sensation devices, smell or taste devices, and the like, that are external to UE 1260.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" or variations thereof as may be used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
receiving, with a processor of a tracking device, which tracking device comprises at least one orientation sensor, at least one baseline orientation signal from the at least one orientation sensor, wherein the at least one baseline orientation signal was generated at a baseline time and with the tracking device being stationary and being in a baseline orientation,
determining, with the processor, at least one baseline orientation value corresponding to the at least one baseline orientation signal;
receiving, with the processor, at least one current orientation signal from the at least one orientation sensor, wherein the at least one current orientation signal was generated by the at least one orientation sensor during a configured no-change period after the baseline time and with the tracking device being stationary and being in a current orientation,
determining, with the processor, at least one new orientation value corresponding to the at least one current orientation signal;
analyzing, with the processor, the at least one new orientation value and the at least one baseline orientation value to result in an orientation change;
analyzing, with the processor, the orientation change with respect to an orientation change criterion to result in an orientation change determination; and
based on the orientation change determination, sending an alert message to a tracking device application indicating the orientation change determination.

2. The method of claim 1, wherein the at least one baseline orientation value comprises a baseline vector corresponding to the baseline orientation of the tracking device in a coordinate system and the new orientation value comprises a new vector corresponding to the current orientation in the coordinate system.

3. The method of claim 1, wherein the analyzing of the orientation change with respect to an orientation change criterion to result in an orientation change determination is made when the at least one new orientation value differs by more than a predetermined tolerance of the at least one baseline orientation value.

4. The method of claim 1, wherein the tracking device further comprises a global positioning satellite system ("GPS") module, and wherein GPS coordinate information is not used to determine whether the tracking device has or has not changed orientation relative to the baseline orientation during the no-change period.

5. The method of claim 1, wherein the tracking device further comprises a wireless communication modem module to facilitate communication with a wireless mobile communication network, wherein wireless mobile communication network information received from the wireless mobile communication network is not used to determine whether the tracking device has or has not changed orientation relative to the baseline orientation during the no-change period.

6. A tracking device, comprising:
at least one orientation sensor;
a processor configured to:
receive at least one baseline orientation signal from the at least one orientation sensor, wherein the at least one baseline orientation signal was generated at a baseline time and with the tracking device being stationary and being in a baseline orientation, determine at least one baseline orientation value corresponding to the at least one baseline orientation signal;

receive at least one current orientation signal from the at least one orientation sensor, wherein the at least one current orientation signal was generated during a configured no-change period after the baseline time and with the tracking device being stationary and being in a current orientation, determine at least one new orientation value corresponding to the at least one current orientation signal;

analyze the at least one new orientation value and the at least one baseline orientation value to result in an orientation change;

analyze the orientation change with respect to an orientation change criterion to result in an orientation change determination; and based on the orientation change determination, send an alert message to a tracking device application indicating the orientation change determination.

7. The tracking device of claim 6, wherein the at least one baseline orientation value comprises a baseline vector corresponding to the baseline orientation of the tracking device in a coordinate system and the new orientation value comprises a new vector corresponding to the current orientation in the coordinate system.

8. The tracking device of claim 6, wherein the analyzing of the orientation change with respect to an orientation change criterion to result in an orientation change determination is made when the at least one new orientation value differs by more than a predetermined tolerance of the at least one baseline orientation value.

9. The tracking device of claim 6, further comprising an orientation module that comprises the at least one orientation sensor.

10. The tracking device of claim 9, wherein the orientation module is a micro electro-mechanical systems device that comprises at least one accelerometer.

11. The tracking device of claim 9, wherein the orientation module is an inertial measurement unit that comprises at least one accelerometer, gyroscope, or magnetometer.

12. The tracking device of claim 6, wherein the at least one new orientation value corresponding to the at least one current orientation signal received from the at least one orientation sensor is received at the end of the predetermined no-change period.

13. The tracking device of claim 6, further comprising a GPS module, wherein GPS coordinate information is not used to determine whether the tracking device has or has not changed orientation relative to the baseline orientation during the no-change period.

14. The tracking device of claim 6, further comprising a wireless communication modem module to facilitate communication with a wireless mobile communication network, wherein wireless mobile communication network information received from the wireless mobile communication network is not used to determine whether the tracking device has or has not changed orientation relative to the baseline orientation during the no-change period.

15. The tracking device of claim 6 further comprising:
a GPS module, wherein GPS coordinate information is not used to determine whether the tracking device has or has not changed orientation relative to the baseline orientation during the no-change period; and
a wireless communication modem module to facilitate communication with a wireless mobile communication network, wherein wireless mobile communication network information received from the wireless mobile communication network is not used to determine whether the tracking device has or has not changed orientation relative to the baseline orientation during the no-change period.

16. A non-transitory machine-readable medium, comprising executable instructions that, when executed by a processor of a tracking device, which tracking device comprises at least one orientation sensor, facilitate performance of operations, comprising:

receiving at least one baseline orientation signal from the at least one orientation sensor, wherein the at least one baseline orientation signal was generated at a baseline time and with the tracking device being stationary and being in a baseline orientation, determining at least one baseline orientation value corresponding to the at least one baseline orientation signal;

receiving at least one current orientation signal from the at least one orientation sensor, wherein the at least one current orientation signal was generated by the at least one orientation sensor during a configured no-change period after the baseline time and with the tracking device being stationary and being in a current orientation, determining at least one new orientation value corresponding to the at least one current orientation signal;

analyzing the at least one new orientation value and the at least one baseline orientation value to result in an orientation change;

analyzing the orientation change with respect to an orientation change criterion to result in an orientation change determination; and based on the orientation change determination, sending an alert message to a tracking device application indicating the orientation change determination.

17. The non-transitory machine-readable medium of claim 16, wherein the at least one baseline orientation value comprises a baseline vector corresponding to the baseline orientation of the tracking device in a coordinate system and the new orientation value comprises a new vector corresponding to the current orientation in the coordinate system.

18. The non-transitory machine-readable medium of claim 16, wherein the analyzing of the orientation change with respect to an orientation change criterion to result in an orientation change determination is made when the at least one new orientation value differs by more than a predetermined tolerance of the at least one baseline orientation value.

19. The non-transitory machine-readable medium of claim 16, wherein the tracking device further comprises a GPS module, and wherein GPS coordinate information is not used to determine whether the tracking device has or has not changed orientation relative to the baseline orientation during the no-change period.

20. The non-transitory machine-readable medium of claim 16, wherein the tracking device further comprises a wireless communication modem module to facilitate communication with a wireless mobile communication network, and wherein wireless mobile communication network information received from the wireless mobile communication network is not used to determine whether the tracking device has or has not changed orientation relative to the baseline orientation during the no-change period.

* * * * *